(12) United States Patent
Holman et al.

(10) Patent No.: US 12,292,718 B2
(45) Date of Patent: *May 6, 2025

(54) TOUCHLESS MULTI-STAGED RETAIL PROCESS AUTOMATION SYSTEMS AND METHODS

(71) Applicant: T-Mobile USA, Inc., Bellevue, WA (US)

(72) Inventors: Jacob Holman, Bonney Lake, WA (US); Ravikiran Mahadevappa Sindogi, Bothell, WA (US); Michael Lim Tang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,094

(22) Filed: May 28, 2024

(65) Prior Publication Data
US 2024/0353802 A1 Oct. 24, 2024

Related U.S. Application Data

(63) Continuation of application No. 17/329,002, filed on May 24, 2021, now Pat. No. 12,019,410.

(51) Int. Cl.
*G05B 11/01* (2006.01)
*G06N 20/00* (2019.01)
(Continued)

(52) U.S. Cl.
CPC ............. *G05B 11/01* (2013.01); *G06N 20/00* (2019.01); *G06Q 10/10* (2013.01); *G06Q 30/0201* (2013.01)

(58) Field of Classification Search
CPC ........ G05B 11/01; G06N 20/00; G06Q 10/10; G06Q 30/0201
See application file for complete search history.

(56) References Cited

U.S. PATENT DOCUMENTS

| | | | |
|---|---|---|---|
| 5,867,823 | A | 2/1999 | Richardson |
| 6,510,989 | B1 | 1/2003 | Ortega |

(Continued)

FOREIGN PATENT DOCUMENTS

| | | |
|---|---|---|
| AU | 2012100063 B4 | 10/2012 |
| AU | 2015414792 A1 | 7/2018 |

(Continued)

*Primary Examiner* — Ziaul Karim
(74) *Attorney, Agent, or Firm* — Perkins Coie LLP

(57) ABSTRACT

A touchless multi-staged retail process automation systems and methods (retail process automation system) to automate key store functionalities within retail stores is disclosed. The retail process automation system receives a set of commands (e.g., a voice command) to automatically perform retail store operations such as opening a store, closing a close, automatically opening tills, etc. with the single command. As a result, the retail process automation system replaces the multiple-touches required by conventional systems with a touchless solution, thereby providing increased time and resource efficiency of managing store operations. For example, the retail process automation system intercepts a voice command to identify the associated retail store information and source of the command. The retail process automation system then generates a set of operations associated with the received voice command to alter a state of the retail store.

18 Claims, 13 Drawing Sheets

(51) Int. Cl.
  *G06Q 10/10* (2023.01)
  *G06Q 30/0201* (2023.01)

(56) References Cited

U.S. PATENT DOCUMENTS

| | | |
|---|---|---|
| 6,609,101 B1 | 8/2003 | Landvater |
| 7,174,304 B1 | 2/2007 | Boardman |
| 7,480,623 B1 | 1/2009 | Landvater |
| RE41,717 E | 9/2010 | Dejaeger |
| 7,918,395 B2 | 4/2011 | Gelbman |
| 8,190,497 B2 | 5/2012 | Odell et al. |
| 8,239,245 B2 | 8/2012 | Bai et al. |
| 8,286,863 B1 | 10/2012 | Brooks |
| 8,533,186 B2 | 9/2013 | Lazaridis et al. |
| 8,606,645 B1 | 12/2013 | Applefeld |
| 8,635,116 B2 | 1/2014 | Fiorentino |
| 8,639,041 B2 | 1/2014 | Grigsby et al. |
| 8,650,100 B1 | 2/2014 | Miller et al. |
| 8,751,316 B1 | 6/2014 | Fletchall et al. |
| 8,827,810 B2 | 9/2014 | Weston et al. |
| 8,886,554 B2 | 11/2014 | Chatterjee et al. |
| 8,910,862 B2 | 12/2014 | Gangi |
| 9,013,602 B2 | 4/2015 | Karn et al. |
| 9,032,304 B2 | 5/2015 | Lotan et al. |
| 9,053,510 B2 | 6/2015 | Crum |
| 9,064,277 B2 | 6/2015 | Wong et al. |
| 9,135,542 B2 | 9/2015 | Odell et al. |
| 9,424,577 B2 | 8/2016 | Mutha |
| 9,449,110 B2 | 9/2016 | Singh et al. |
| 9,470,532 B2 | 10/2016 | Pellow et al. |
| 9,501,793 B1 | 11/2016 | Edelman et al. |
| 9,595,058 B2 | 3/2017 | Khalid |
| 9,606,982 B2 | 3/2017 | Macmillan et al. |
| 9,639,872 B2 | 5/2017 | Dyer et al. |
| 9,811,840 B2 | 11/2017 | Sinclair |
| 9,892,424 B2 | 2/2018 | Abraham et al. |
| 9,928,531 B2 | 3/2018 | Mccarthy |
| 10,102,564 B2 | 10/2018 | Pellow et al. |
| 10,121,116 B2 * | 11/2018 | Tamblyn ............. H04M 3/5175 |
| 10,146,766 B2 | 12/2018 | Macmillan et al. |
| 10,157,415 B2 | 12/2018 | Perks et al. |
| 10,176,452 B2 | 1/2019 | Rizzolo et al. |
| 10,255,640 B1 | 4/2019 | Rossmark et al. |
| 10,269,026 B2 | 4/2019 | Cook et al. |
| 10,318,907 B1 | 6/2019 | Bergstrom et al. |
| 10,362,439 B2 | 7/2019 | Kao |
| 10,417,387 B2 | 9/2019 | Toupin et al. |
| 10,417,690 B2 | 9/2019 | Mueller et al. |
| 10,430,841 B1 | 10/2019 | Shah |
| 10,438,159 B2 | 10/2019 | Edelman et al. |
| 10,482,527 B2 | 11/2019 | Porter et al. |
| 10,572,932 B2 | 2/2020 | Kumar et al. |
| 10,592,959 B2 | 3/2020 | Wilkinson et al. |
| 10,671,986 B2 | 6/2020 | Yen et al. |
| 10,691,889 B2 | 6/2020 | Macmillan et al. |
| 10,713,615 B2 | 7/2020 | Smith et al. |
| 10,733,661 B1 | 8/2020 | Bergstrom et al. |
| 10,783,582 B2 | 9/2020 | Deperro et al. |
| 10,803,439 B2 | 10/2020 | Evans |
| 10,853,851 B2 | 12/2020 | Shah |
| 10,943,291 B2 | 3/2021 | Wiedmeyer et al. |
| 10,972,866 B1 | 4/2021 | Macdonald-Korth et al. |
| 10,984,404 B2 | 4/2021 | Nack et al. |
| 10,991,036 B1 | 4/2021 | Bergstrom et al. |
| 11,004,153 B2 | 5/2021 | Rossmark et al. |
| 2005/0288989 A1 | 12/2005 | Kim et al. |
| 2006/0149639 A1 | 7/2006 | Liu et al. |
| 2009/0106160 A1 | 4/2009 | Skowronek |
| 2010/0153174 A1 | 6/2010 | Angell et al. |
| 2011/0015966 A1 | 1/2011 | Wasco |
| 2011/0145051 A1 | 6/2011 | Paradise et al. |
| 2012/0239536 A1 | 9/2012 | Takahashi |
| 2012/0320214 A1 * | 12/2012 | Kundu ................. G06Q 30/06 |
| | | 348/150 |
| 2013/0219434 A1 | 8/2013 | Farrell et al. |
| 2013/0254006 A1 | 9/2013 | Braun et al. |
| 2014/0058899 A1 | 2/2014 | Fellinger et al. |
| 2014/0081682 A1 | 3/2014 | Perlmuter |
| 2014/0172697 A1 | 6/2014 | Ward et al. |
| 2014/0278773 A1 | 9/2014 | Fiorentino |
| 2014/0344041 A1 * | 11/2014 | Yeleswarapu ........ G06Q 20/322 |
| | | 705/14.23 |
| 2014/0379534 A1 | 12/2014 | Brazell |
| 2015/0081392 A1 | 3/2015 | Fox et al. |
| 2015/0100418 A1 * | 4/2015 | Gangi .................. G06Q 20/383 |
| | | 705/14.51 |
| 2015/0100445 A1 | 4/2015 | Johnson et al. |
| 2015/0106202 A1 | 4/2015 | Bastaldo-tsampalis et al. |
| 2015/0262236 A1 | 9/2015 | Cypher et al. |
| 2015/0278849 A1 | 10/2015 | Reichert |
| 2015/0363796 A1 | 12/2015 | Lehman et al. |
| 2016/0048871 A1 | 2/2016 | Glass et al. |
| 2016/0140585 A1 | 5/2016 | Popescu et al. |
| 2016/0148226 A1 | 5/2016 | Popescu |
| 2016/0232461 A1 | 8/2016 | Popescu et al. |
| 2016/0247172 A1 | 8/2016 | Lei et al. |
| 2017/0061346 A1 | 3/2017 | High et al. |
| 2017/0076356 A1 | 3/2017 | Agrawal et al. |
| 2017/0098175 A1 | 4/2017 | Norby et al. |
| 2017/0154349 A1 | 6/2017 | Popescu et al. |
| 2017/0206546 A1 * | 7/2017 | Martin .................. G06F 3/0481 |
| 2017/0249685 A1 | 8/2017 | Villa |
| 2017/0372401 A1 | 12/2017 | Wang et al. |
| 2018/0005174 A1 | 1/2018 | Dixon et al. |
| 2018/0053172 A1 | 2/2018 | Nack et al. |
| 2018/0060943 A1 | 3/2018 | Mattingly et al. |
| 2018/0189888 A1 | 7/2018 | Deperro et al. |
| 2018/0197218 A1 | 7/2018 | Mallesan et al. |
| 2018/0197227 A1 | 7/2018 | Mchale et al. |
| 2018/0268352 A1 | 9/2018 | Fantini |
| 2018/0285893 A1 | 10/2018 | Deluca et al. |
| 2018/0300114 A1 | 10/2018 | Stohrer et al. |
| 2018/0308048 A1 | 10/2018 | Nemati et al. |
| 2019/0005143 A1 | 1/2019 | Cypher et al. |
| 2019/0005498 A1 | 1/2019 | Roca et al. |
| 2019/0005569 A1 * | 1/2019 | Kotha .................... G06F 16/29 |
| 2019/0019228 A1 | 1/2019 | Reddy et al. |
| 2019/0026676 A1 | 1/2019 | Tamblyn et al. |
| 2019/0205915 A1 | 7/2019 | Hunter et al. |
| 2019/0272596 A1 | 9/2019 | Pancholi et al. |
| 2019/0362413 A1 | 11/2019 | Joshi et al. |
| 2019/0370709 A1 | 12/2019 | Hodges et al. |
| 2020/0034775 A1 | 1/2020 | Edelman et al. |
| 2020/0042914 A1 | 2/2020 | Karmakar et al. |
| 2020/0074373 A1 | 3/2020 | Adato et al. |
| 2020/0082924 A1 | 3/2020 | Toupin et al. |
| 2020/0273048 A1 | 8/2020 | Andon et al. |
| 2020/0372216 A1 | 11/2020 | Macmillan et al. |
| 2020/0372529 A1 | 11/2020 | Saarenvirta |
| 2020/0402092 A1 | 12/2020 | Williams et al. |
| 2021/0035137 A1 | 2/2021 | Poole |
| 2021/0065080 A1 | 3/2021 | Brockman et al. |
| 2021/0065122 A1 | 3/2021 | Brockman et al. |
| 2021/0082007 A1 | 3/2021 | Shah |
| 2021/0097467 A1 | 4/2021 | Liang et al. |
| 2021/0117171 A1 | 4/2021 | Stohrer et al. |
| 2021/0117949 A1 | 4/2021 | Guo et al. |
| 2021/0166300 A1 | 6/2021 | Wiedmeyer et al. |
| 2021/0342785 A1 * | 11/2021 | Mann ................... G06F 40/186 |
| 2021/0366149 A1 * | 11/2021 | Almazán ................ G06T 7/73 |
| 2022/0374849 A1 * | 11/2022 | Rathod ................ G07G 1/0036 |

FOREIGN PATENT DOCUMENTS

| | | |
|---|---|---|
| CA | 2733804 A1 | 2/2010 |
| CA | 2798863 A1 | 2/2013 |
| CA | 2956606 A1 | 2/2016 |
| CA | 2511231 C | 6/2016 |
| CA | 2972893 A1 | 7/2016 |
| CA | 2744629 C | 10/2016 |
| CA | 2798965 C | 1/2017 |
| CA | 2939729 A1 | 2/2017 |
| CA | 3020450 A1 | 10/2017 |
| CA | 3023644 A1 | 10/2017 |

(56) References Cited

FOREIGN PATENT DOCUMENTS

| | | |
|---|---|---|
| CA | 2976571 A1 | 2/2018 |
| CA | 3034097 A1 | 3/2018 |
| CA | 3067361 A1 | 1/2019 |
| CA | 3039878 A1 | 10/2019 |
| CN | 107293051 A | 10/2017 |
| CN | 109643527 A | 4/2019 |
| CN | 110570154 A | 12/2019 |
| CN | 110738438 A | 1/2020 |
| CN | 110738541 A | 1/2020 |
| CN | 110770719 A | 2/2020 |
| CN | 110998592 A | 4/2020 |
| CN | 112465541 A | 3/2021 |
| DE | 202010018193 U1 | 7/2014 |
| EP | 2282290 A1 | 2/2011 |
| EP | 3166066 A1 | 5/2017 |
| EP | 3309728 A1 | 4/2018 |
| EP | 3378016 A1 | 9/2018 |
| EP | 3424039 A1 | 1/2019 |
| EP | 3735669 A1 | 11/2020 |
| EP | 3742336 A1 | 11/2020 |
| GB | 2273589 A | 6/1994 |
| GB | 2543393 A | 4/2017 |
| IN | 2011CN01615 A | 12/2011 |
| IN | 201841043695 | 6/2020 |
| IN | 202147016897 | 4/2021 |
| KR | 20130066478 A | 6/2013 |
| KR | 101729414 B1 | 4/2017 |
| MX | 2016011196 A | 2/2017 |
| MX | 2018012484 A | 3/2019 |
| MX | 2019002216 A | 7/2019 |
| SG | 10201805726 T | 2/2019 |
| WO | 0225823 A2 | 3/2002 |
| WO | 2008115278 A2 | 9/2008 |
| WO | 2013119743 A1 | 8/2013 |
| WO | 2013140386 A1 | 9/2013 |
| WO | 2013152444 A1 | 10/2013 |
| WO | 2016018897 A1 | 2/2016 |
| WO | 2017062302 A1 | 4/2017 |
| WO | 2017086999 A1 | 5/2017 |
| WO | 2017095634 A1 | 6/2017 |
| WO | 2017173457 A1 | 10/2017 |
| WO | 2017180977 A1 | 10/2017 |
| WO | 2018129028 A1 | 7/2018 |
| WO | 2018200557 A1 | 11/2018 |
| WO | 2019006116 A1 | 1/2019 |
| WO | 2019136020 A1 | 7/2019 |
| WO | 2019227480 A1 | 12/2019 |
| WO | 2019231482 A1 | 12/2019 |
| WO | 2019232434 A1 | 12/2019 |
| WO | 2020152487 A1 | 7/2020 |
| WO | 2020257394 A1 | 12/2020 |
| WO | 2021037202 A1 | 3/2021 |
| WO | 2021072699 A1 | 4/2021 |

* cited by examiner

| Provide an overall description of the issue: | | Store status: Closed |
|---|---|---|
| Please include details of what is occurring. The steps to reproduce the issue. Any additional details to help support teams troubleshoot the issue. | Quick Open To open store #123, enter the starting balance for all tills to be opened. | |
| | Mobility till: 2A5JB  Starting total  Open till  ◐ Tender type: Cash  $150.00 | |
| Date/Time issue occurred*: | Mobility till: 7R6HO  Starting total  Open till  ◐ Tender type: Cash  $150.00 | |
| 07-22-2019 9:17:21 AM PDT  mm/dd/yy | Mobility till: 3D9AB  Starting total  Open till  ◐ Tender type: Cash  $150.00 | |
| Reattempt made*:  Tablets Affected*: | Mobility till: 8T3ZR  Starting total  Open till  ◐ Tender type: Cash  $150.00 | |
| | Inactive Tills These tills have been inactive for more than 3 months. Please open the till if desired. | |
| | Mobility till: 8O9HB  Starting total  Open till  ◐ Tender type: Cash  $150.00  Last used: mm/dd/yy | |
| | Submit Quick Ticket  For till 8O9HB. | |
| | Submit Issue  Cancel | Open store |
| | Cancel | Save |
| | System details included with issue: | |
| | NT ID: retailjump | EMV appWare version: 2.04.41.27 |

*FIG. 5E*

TOUCHLESS MULTI-STAGED RETAIL PROCESS AUTOMATION SYSTEMS AND METHODS

CROSS-REFERENCE TO RELATED APPLICATIONS

This application is a continuation of U.S. patent application Ser. No. 17/329,002, filed May 24, 2021, which is hereby incorporated by reference in its entirety.

BRIEF DESCRIPTION OF THE DRAWINGS

FIGS. 5A-5H are examples of user interfaces that can be used according to various implementations.

Figure 1:
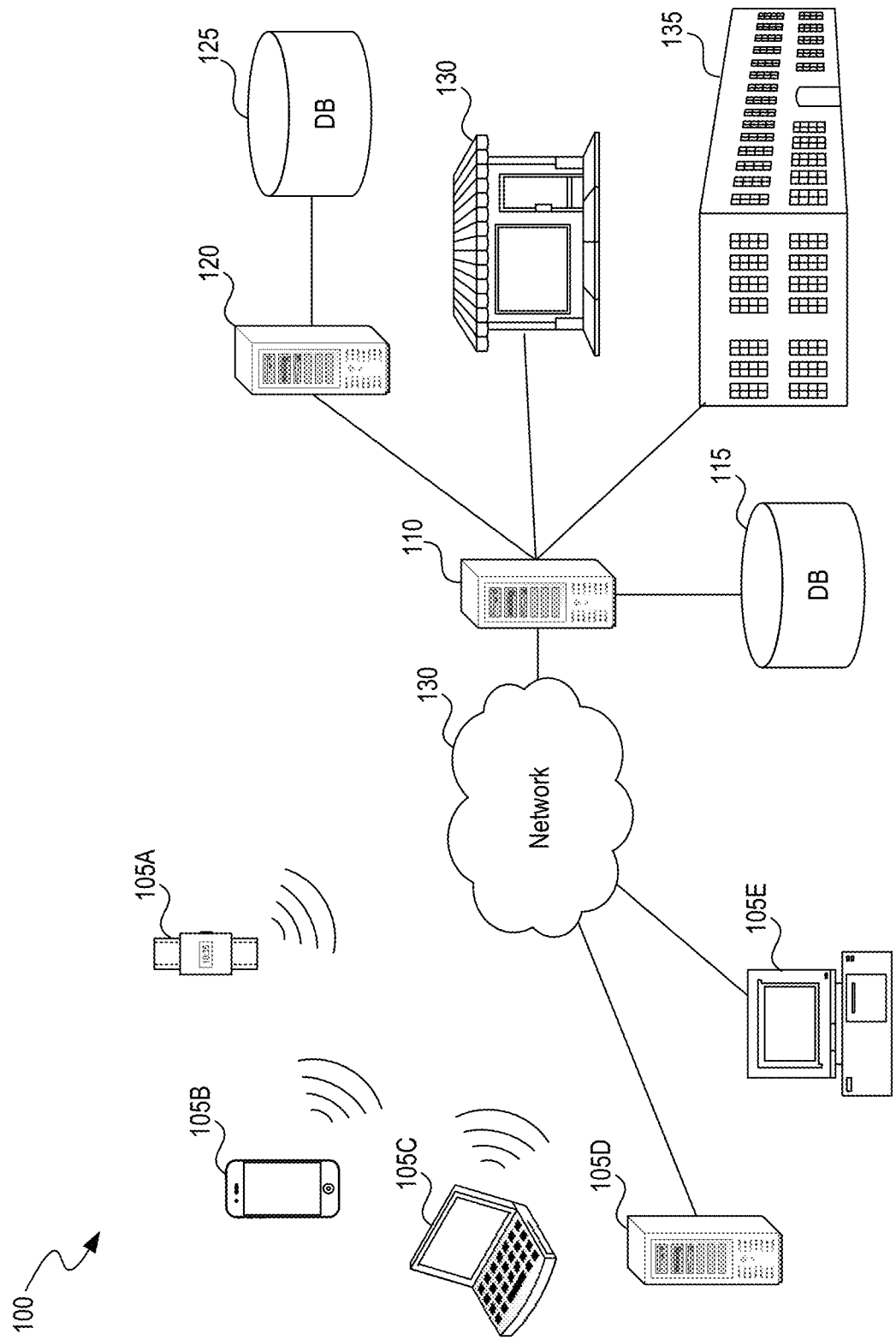
FIG. 1 is a system diagram illustrating an example of a computing environment in which the retail process automation system operates according to various implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Retailers typically maintain hundreds, if not thousands of stores. Each store is unique and offers a set of services and products to customers. Store operations are complex and comprise several steps for both store opening and store closing. For instance, in a retail store environment, a worker (e.g., a cashier) will start his/her shift with a starting till when a store opens. This is an amount of money made up of a certain amount of notes of varying denominations and a certain amount of coin. Different store tills can be associated with different starting amounts. The tills can be associated with a central system such that a store can be activated/opened after the tills are brought online with a centralized system. In addition, one or more reports (e.g., tills summary report) can be generated when a store opens. Similarly, when a store closes, the open tills are closed, their ending amount is captured, and one or more end-of-day reports are run. Typically, a store manager performs a set of detailed steps to open or close a store. Moreover, a store manager has to perform the multi-touch steps in a specific order. However, depending on certain criteria (e.g., weekend, holiday week, light day, busy day, etc.), the store manager may perform different steps and/or steps in a different order to open the same store. Also, different users may open the same store with different profiles. For example, while a store manager may open a store with five tills, a regional manager may be authorized to open the same store with fifteen tills with varying opening accounts, and different reports. Overall, store opening and closing can take anywhere from 20 minutes to an hour—and even then, the possibility of human/manual error is high. Since store opening and closing operations are complex and involve multiple touch-points (e.g., managing multiple tills and associated starting and ending amounts, report generation infrastructure, and so on), these operations are time and resource intensive.

To solve these and other problems with conventional systems, the inventors have conceived and reduced to practice touchless multi-staged retail process automation systems and methods (retail process automation system) to automate key store functionalities within retail stores. The retail process automation system receives a single command (e.g., a voice command) to automatically perform retail store operations such as opening a store, closing a store, automatically opening tills, etc. with the single command. As a result, the retail process automation system replaces the multiple-touches required by conventional systems with a touchless solution, thereby providing increased time and resource efficiency of managing store operations. For example, the retail process automation system intercepts a voice command (e.g., "Open store ABC in regular mode") to identify the associated retail store information (e.g., store identifier) and source of the command (e.g., user who invoked the command). The retail process automation system then generates a set of operations associated with the received voice command. For example, the retail process automation system generates a set of API calls for opening a store when it receives a voice command "Open store ABC in regular mode." The retail process automation system can then intercept the responses from the APIs and continue down a particular operational flow, all with a single command.

In the following description, for the purposes of explanation, numerous specific details are set forth in order to provide a thorough understanding of implementations of the present technology. It will be apparent, however, to one skilled in the art, that implementations of the present technology can be practiced without some of these specific details.

The phrases "in some implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

FIG. 1 is a system diagram illustrating an example of a computing environment in which the retail process automation system operates according to various implementations. In some implementations, environment 100 includes one or more client computing devices 105A-E, examples of which can include computer system 600. Client computing devices 105 operate in a networked environment using logical connections through network 130 to one or more remote computers, such as a server computing device. Client computing devices 105 can receive commands/instructions from one or more users to perform retail store operations.

In some implementations, server 110 is an edge server which receives client requests. Server 110 can coordinate fulfillment of those requests through other servers, such as server 120. Server 110 can route those requests to computing devices located in one or more identified retail stores, such as stand-alone store 140, store in a group location, such as a mall 135, and so on. Server computing devices 110 and 120 comprise computing systems, such as computer system 600. Though each server computing device 110 and 120 is displayed logically as a single server, server computing devices can each be a distributed computing environment encompassing multiple computing devices located at the same or at geographically disparate physical locations. In some implementations, each server 120 corresponds to a group of servers.

Client computing devices 105 and server computing devices 110 and 120 can each act as a server or client to other server/client devices. In some implementations, servers (110, 120) connect to a corresponding database (115, 125). As discussed above, each server 120 can correspond to a group of servers, and each of these servers can share a database or can have its own database. Databases 115 and 125 warehouse (e.g., store) information such as store information (e.g., store identifier, location, capacity, number of tills, type of store, etc.), store employee information (e.g., number of employees, manager identifier(s), employee identifier(s), employee name(s), addresses, contact details, etc.), operations information (e.g., operation flows, operation dependencies, operations history, etc.), and so on. Though databases 115 and 125 are displayed logically as single units, databases 115 and 125 can each be a distributed computing environment encompassing multiple computing devices, can be located within their corresponding server, or can be located at the same or at geographically disparate physical locations.

Network 130 can be a local area network (LAN) or a wide area network (WAN), but can also be other wired or wireless networks. In some implementations, network 130 is the Internet or some other public or private network. Client computing devices 105 are connected to network 130 through a network interface, such as by wired or wireless communication. While the connections between server 110 and servers 120, and stores 140, 135 are shown as separate connections, these connections can be any kind of local, wide area, wired, or wireless network, including network 130 or a separate public or private network.

Aspects of the system can be implemented in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system can reside on a server computer, while corresponding portions can reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

Figure 2:
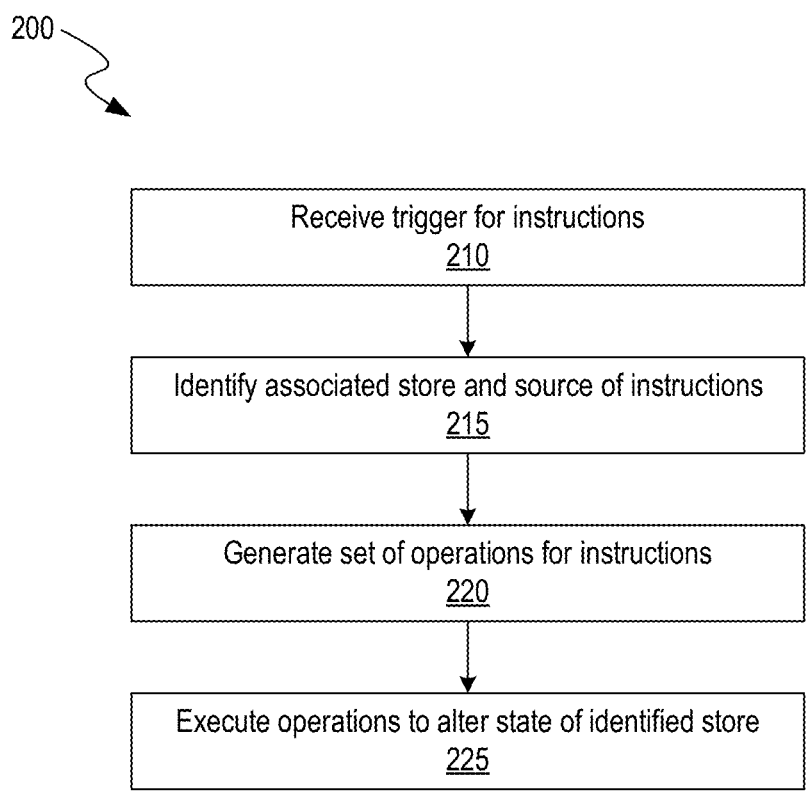
FIG. 2 is a flow diagram illustrating a process of retail process automation system according to various implementations.
Figure 5A:
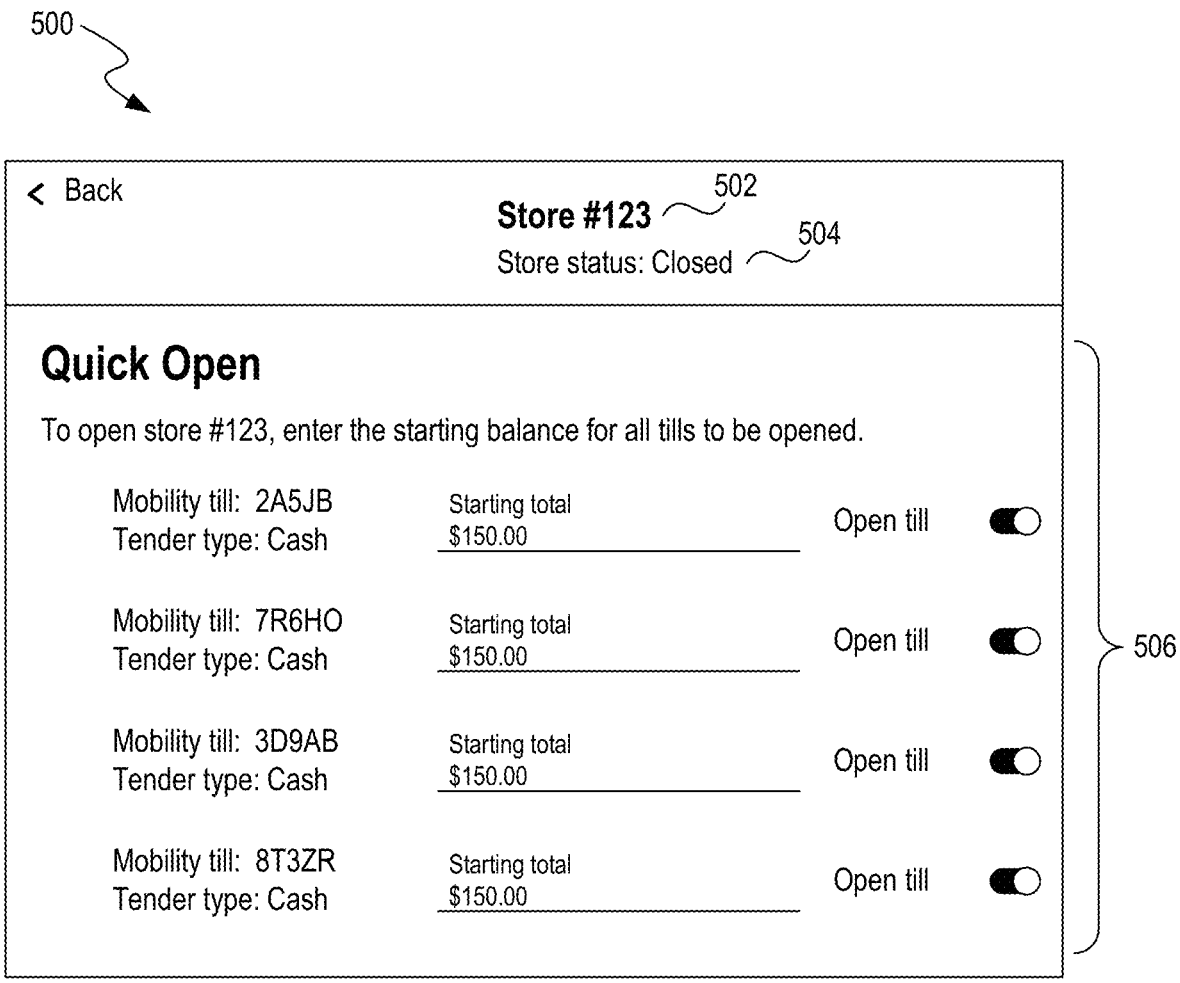
Figure 5B:

FIG. 2 is a flow diagram illustrating a process 200 of retail process automation according to various implementations. Process 200 begins at act 210 where it receives a trigger for instructions related to a retail store. The trigger can be in the form of voice command(s), UI command(s), and so on. For example, the trigger for instructions can be received via a voice bot application, such as Siri®, Alexa®, and so on. The instructions trigger can be associated with an intent, such as opening a store, closing a store, running reports, and so on. For example, as illustrated in FIG. 5A, process 200 can receive instructions (via a voice command and/or a user interface) to "Quick open store ABC with all tills at $150." As another example, as illustrated in FIG. 5B, process 200 can receive instructions via a UI selection to "Open first three tills of store ABC with $150." Other examples of instructions include, but are not limited to searching for customer information (e.g., "Search customer '1234567890'"), activate an account (e.g., "Start activation"), modify customer account (e.g., "Start adding new line"), manage payments (e.g., "Take payment" within a flow), add reports, automating number of tolls to be opened based on number of scheduled workers for a day, and so on. Process 200 enables users to customize or set preference commands, which can be loaded by authentication module. In some implementations, process 200 receives a set of instructions. For example, process 200 can receive the following set of instructions to open a store: "Open first three tills of store ABC with $150; Run reports 2, 3, and 4; Print reports at printer ABC." In some implementations, process 200 receives instructions associated with one or more preconfigured profiles, such as normal day, rush day, weekend, holiday week, light day, busy day, etc. For example, process 200 receives the following instructions to open a store: "Open store as a weekend day."

Upon receiving the instructions trigger, process 200, at act 215, identifies the store associated with the instructions. For example, upon receiving voice instructions to "Quick open store ABC with all tills at $150," process 200 parses the instructions (using, for example, natural language processing methods) to identify that the store associated with the instructions trigger is "store ABC." Process 200 can then access a data structure and/or a database to identify a store identifier associated with "store ABC." In some implementations, process 200 can access a location of a user's device (via which the instructions trigger is received) to identify (or suggest) a store associated with the instructions. Process 200 can also identify a source of the voice instructions. For example, using a voice signature (and/or other biometrics information), process 200 can identify the source who initiated the instructions trigger. As other examples, process 200 can identify the source based on login information of a user, information of a user associated with the device from which the instructions trigger was received, and so on. In some implementations, process 200 can first identify the source of the instructions and then identify the associated store based on the source's past behavior (e.g., the last store managed by a store manager who triggered the current instructions).

Figure 5C:
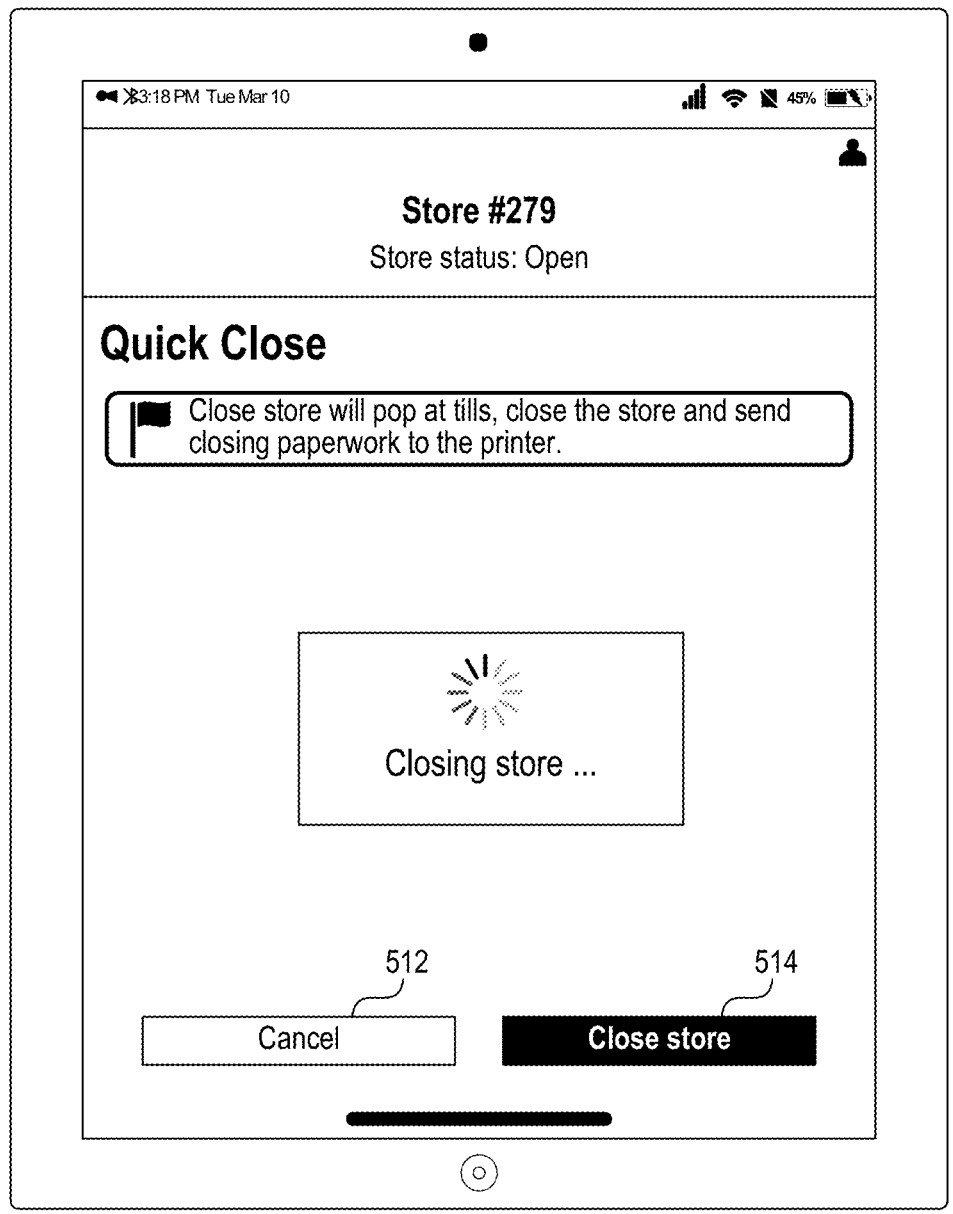
Figure 5D:
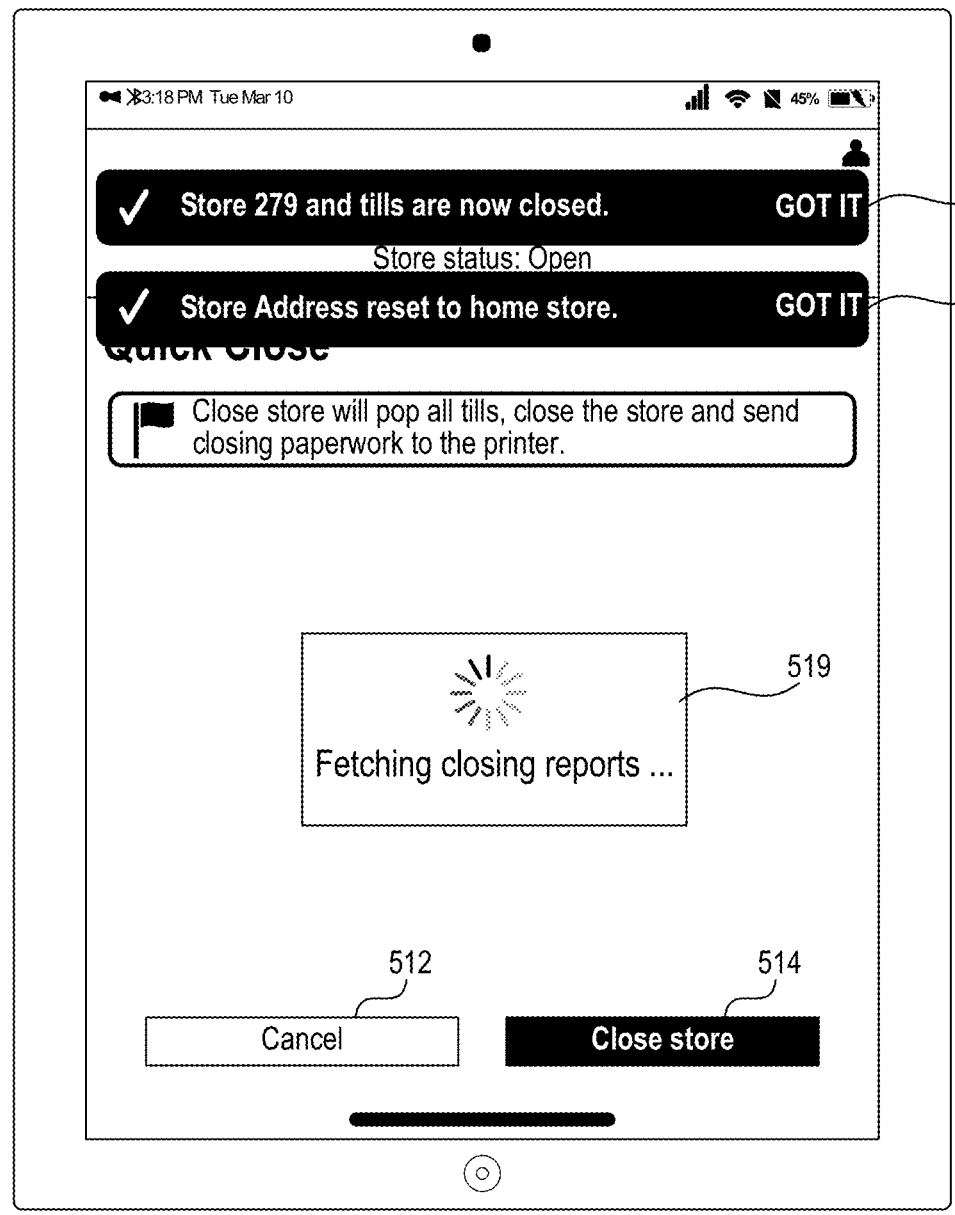
Figure 5F:
Figure 5G:

In some implementations, when process 200 receives the trigger instructions, it can display the relevant information related to the trigger instructions at a user interface. FIG. 5A is an example user interface 500 displayed when process 200 receives a command to open a store with all tills at a default starting amount. User interface 500 displays store information 502, current store status 504, and till information 506. FIG. 5B is an example user interface 507 displayed when process 200 receives a command to open a store with some tills at a default starting amount. User interface 507 displays store open till information 508, and closed till information 510, with an option for the user to open the closed till(s) and specify an opening till amount. FIG. 5C is an example user interface displayed when process 200 receives a command to close a store; the user can be presented with options to cancel the store closing command using control 512 and/or confirm the store closing using control 514. FIG. 5E is an example user interface to help in opening issue ticket within a store. FIGS. 5F-5G are example user interfaces to help in generating reports, such as daily reports and/or on-demand reports. Users can select a report date using controls 530, 534, and select one or more reports to be generated using controls 532, 536.

At act 220, process 200 generates a set of operations for the received trigger instructions. Process 200 can select and/or compile the set of operations using the received trigger instructions. For example, after receiving a trigger instruction, process 200 can identify one or more instruction identifiers for the received trigger instruction (e.g., each type of trigger instruction can be associated with a unique identifier). As another example, when process 200 receives instructions associated with one or more preconfigured profiles, process 200 identifies the associated instruction identifiers associated with the selected profile. Then, based on the instruction identifier, process 200 can identify a set of operations associated with that instruction identifier. For example, for a trigger instruction to open a store, process 200 can identify the following set of operations: login, open cash drawers (till number, till starting amount), and activate store (brings tills online within all systems). As another example, for a trigger instruction to close a store, process 200 can identify the following set of operations: login, close cash drawers, and deactivate store (brings store offline within all systems). As another example, for a trigger instruction to generate reports for a store, process 200 can identify the following set of operations: tabulate transactions, generate report(s), and print report(s). As another example, for a trigger instruction to perform an audit of a store (e.g., "audit store ABC"), process 200 can automate the memos that are created for audits by gathering necessary data to maintain and update audit reports for the store.

Process 200 can then identify one or more APIs to invoke for the identified set of operations. For example, process 200 identifies the following APIs for opening a store: login API (user identifier), open cash drawer API (starting amount, till number, open command), and activate store API. As another example, process 200 identifies the following APIs for closing a store: login API (user identifier), close cash drawer API (ending amount, till number, close command), and deactivate store API. As another example, process 200 identifies the following APIs for generating reports for a store at periodic internals (e.g., end of day, audits, and so on): tabulate all transactions-balance APIs (starting amount, transactions, end amount), generate report API (can turn transaction information into a printable format (e.g., pdf), and print API (prints report(s) automatically)).

Figure 5H:
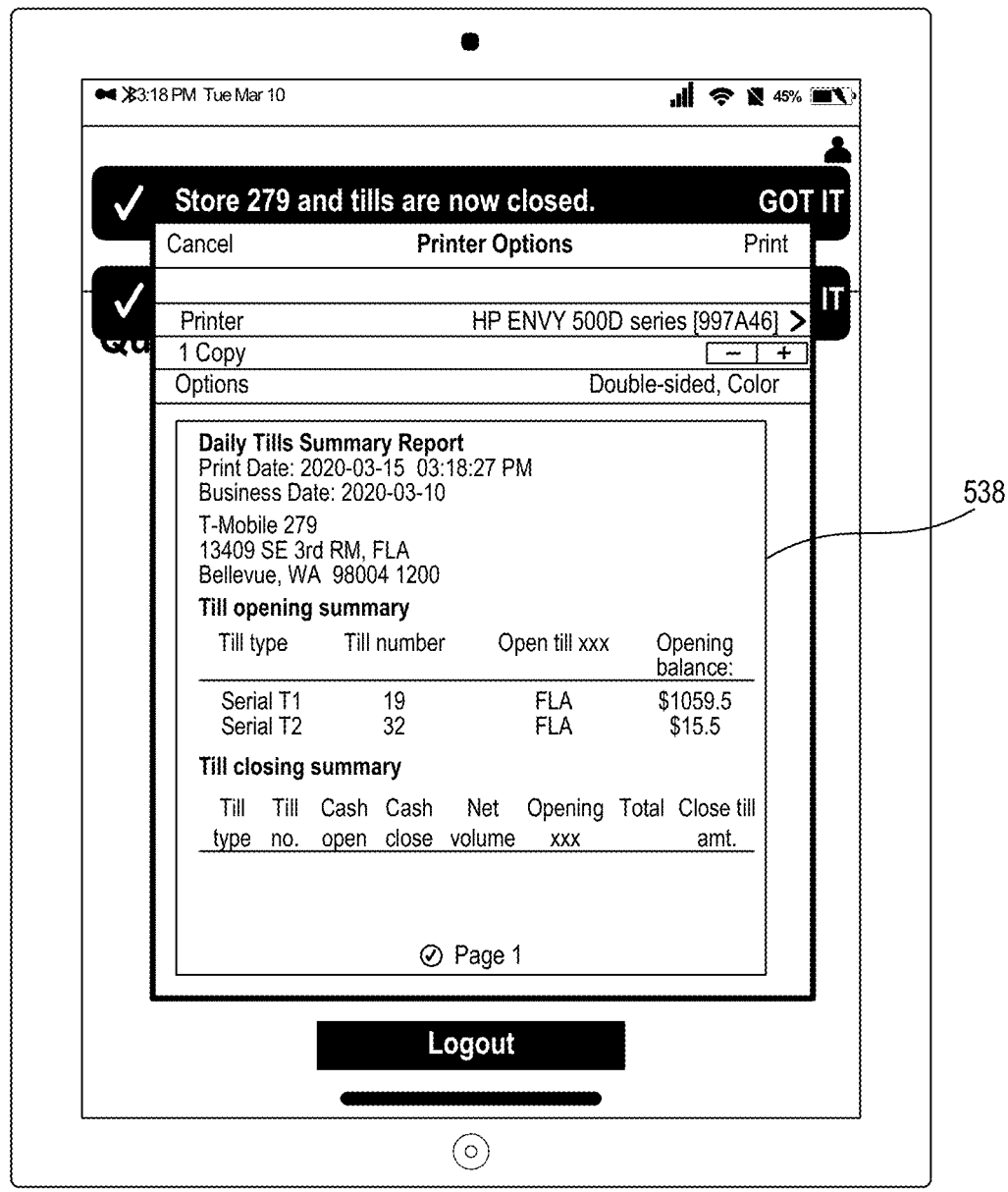

At act 225, process 200 executes the operations in the generated set of operations to alter the current state of the identified store. In some implementations, process 200 can auto advance a store operations management application through various views that illustrate the execution of the operations without any further user interaction. For example, process 200 can automatically execute the APIs associated with the set of operations to alter the current state of the identified store. FIG. 5D is an example user interface 515 displayed as process 200 executes operations to close a store. User interface 515 displays the operations and their statuses 516-519 as the operations are executed. FIG. 5H is an example user interface to enable a user to print a status report (using control 538) once process 200 completes execution of the operations. In some implementations, process 200 can execute the operations to alter the current state of the identified target retail store at an execution time later than a receipt time of the trigger for instructions. The execution time can be received as part of the trigger for instructions, can be determined based on past behavior of the source of the trigger instructions, can be determined based on one or more of the following: operating hours of the target retail store, or current events information, or the associated intent, and so on.

Figure 3:
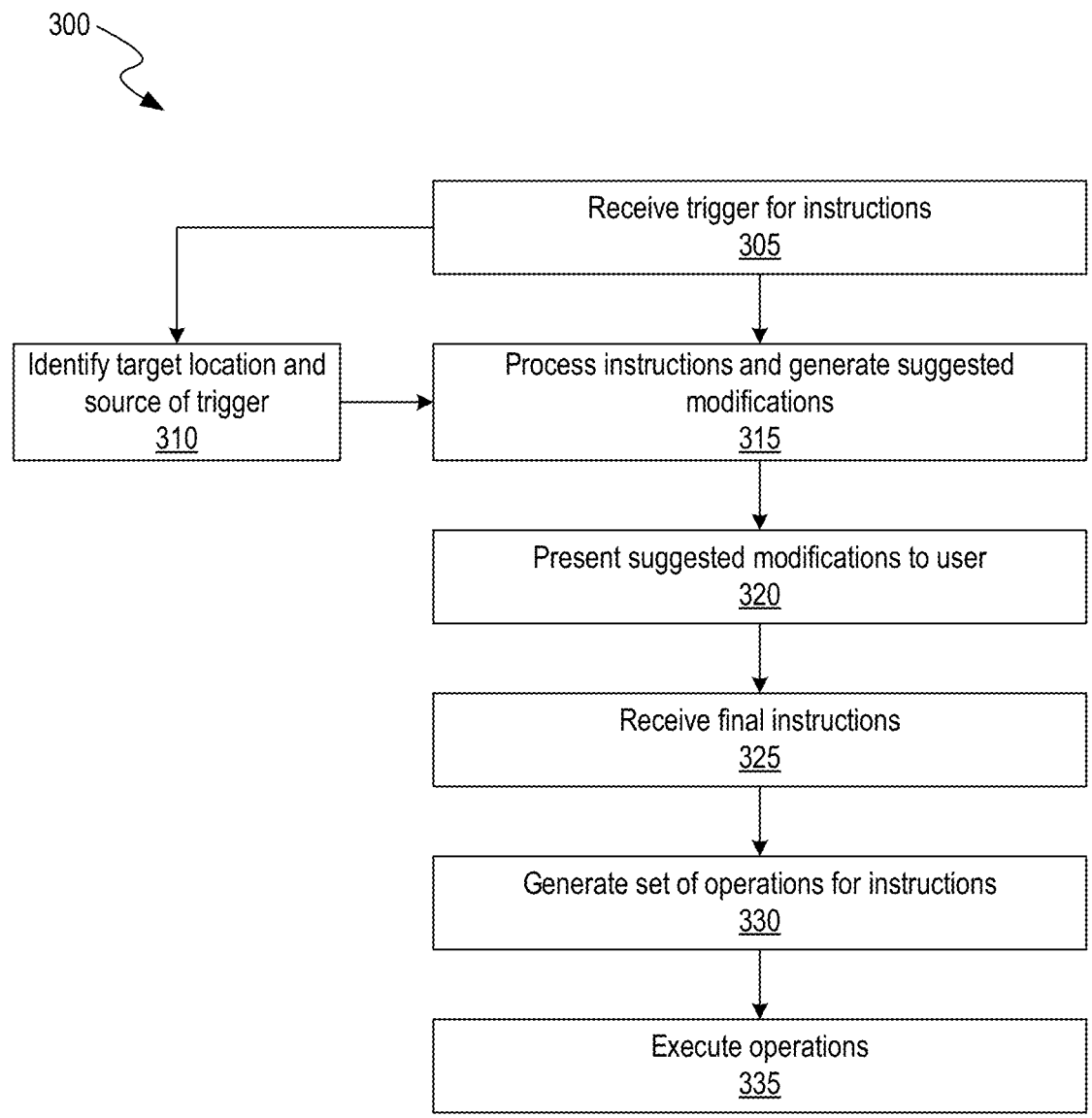
FIG. 3 is a flow diagram illustrating a process of retail process automation according to various implementations.

FIG. 3 is a flow diagram illustrating a process 300 of retail process automation according to various implementations. Similar to process 200 of FIG. 2, process 300 begins at act 305 where it receives a trigger for instructions related to a retail store. Upon receiving the instructions trigger, process 300, at act 310, identifies the store associated with the instructions and/or a source of the instructions (similar to act 215 of process 200). At act 315, process 300 processes the trigger instructions to generate one or more suggested modifications using, for example, one or more trained machine learning models.

Figure 4:
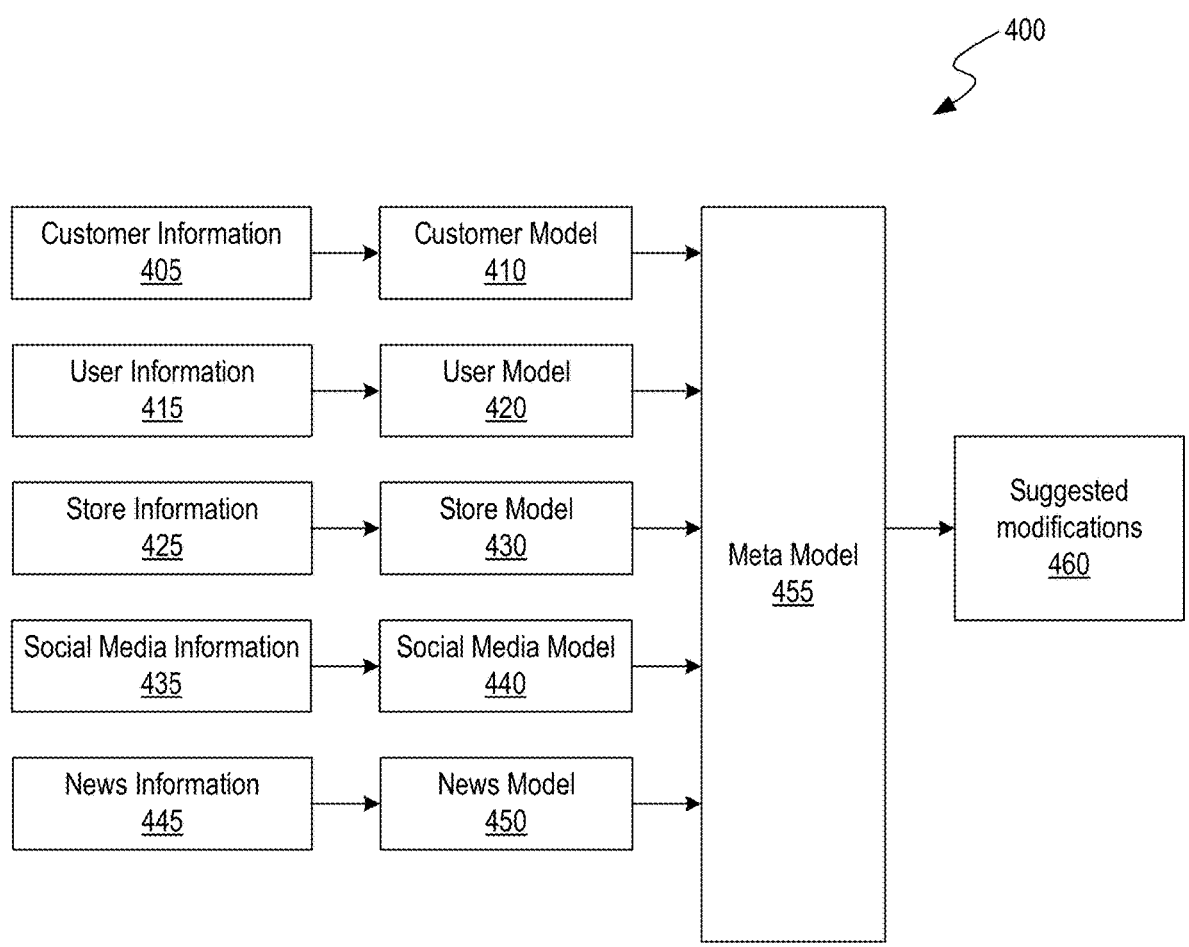
FIG. 4 is a data flow diagram showing a typical process used by the retail process automation system in some embodiments to generate suggested modifications corresponding to an instruction trigger.

FIG. 4 is a data flow diagram showing a typical process used by the retail process automation system in some embodiments to generate suggested modifications corresponding to an instruction trigger. A customer information store 405 is shown, from which attributes of a customer are provided to a customer model 410 that produce customer behavior parameter values. The customer information store 405 can comprise information such as call service records, customer behavior information (e.g., time/day when customers access stores, how much time customers spend at a store, services/products utilized by customers, customer demographic information, customer age, customer employment information, customer education information, and so on). Examples of customer behavior parameters include, but are not limited to, popular times when customers visit store, customer behavior patterns, and so on. A user information store 415 is shown, from which attributes of a user are provided to a user model 420 that produce user behavior parameter values. The user information store 415 can comprise information such as user behavior information (e.g., time/day when users issue instructions, stores visited, types of instructions issued, form of instructions (e.g., verbal, UI, and so on), composition of instructions (e.g., single instructions with details, composite instructions with details, and so on), how much time users spend at a store, services/products utilized by users, users demographic information, users age, users employment information, users education information, and so on). Examples of user behavior parameters include, but are not limited to, typical times when user visit store, typical instructions issued by user, typical instructions issued by user of certain type (e.g., manager, cashier, service technician, etc.), user behavior patterns, and so on.

A store information store 425 is shown, from which attributes of a store are provided to a store model 430 that produce store parameter values. The store information store 425 can comprise information such as store location, operating hours, type (standalone, mall, etc.), stock information, till information, employee information, services/products offered, occupancy limits, and so on. Examples of store parameters include, but are not limited to, store occupancy behavior patterns, busy times, busy days, most popular services, most popular products, and so on. A social information store 435 is shown, from which attributes of social media presence are provided to a social media model 440 that produce social media behavior parameter values. The social information store 435 can comprise information about one or more social media accounts and/or aggregate information, such as post locations, post platform (e.g., Twitter®, Facebook®, Instagram®, Tinder®, TikTok®, etc.), post details, post date/time, and so on. Examples of social media behavior parameters include, but are not limited to, popular post dates/times, location of posts in reference to store location, and so on. A news information store 445 is shown, from which attributes of news events are provided to a news model 450 that produce news behavior parameter values. The news information store 445 can comprise information such as current events (e.g., launch of new product/service), disaster information, and so on. Examples of news behavior parameters include, but are not limited to, correlation between news events and customer behavior, correlation between news events and store occupancy/traffic, and so on. The outputs from one or more models are provided to a meta model 455. The meta model 455 applies various techniques such as input weighting, bias correction, data smoothing, and confidence interval estimation in producing one or more suggested modifications 460 to the received instructions.

In some implementations, when the retail process automation system receives a new command (for example, a command for which a corresponding set of operations is not available), the system can parse the new command to identify its constituent parts (e.g., parse a sentence to identify the constituent words). The system can then identify other previously stored and mapped command to identify matches for the new command (e.g., via k-means clustering and other similar techniques). In some implementations, when a new command is encountered, the system can prompt the user to map the new command to a set of operations. For example, upon receiving a new command, the system can prompt the user to specify whether he/she would like to map the new command with a set of actions. When the user agrees to map the new command, the system can begin recording the actions/operations the user performs when performing the new command until a "done" action is performed. With this breadcrumb approach, the system creates a mapping of the new command and a set of actions/operations. The system can then record/save the mapping in a database.

The retail process automation system can learn one or more features associated with the received instructions, such as time of day of action, user information, location information, till numbers used, starting amounts, report types, and so on. For example, the system can learn that a store representative A opens a store with specific till numbers and specific starting amounts. The system records the action taken by a user A or preferences which is common for the store based on command. There can be phrase commands like "open store busy today", "open store for event", or "open store for thanksgiving" which identify to open a particular number of tills (e.g., greater than four tills, greater than six tills, and so on). Based on the learning and preference set by a user, the system can update the set of operations associated with the command. For example, when the system identifies that the received instructions are to open a store from store representative A, it can automatically suggest opening the store with the information it has learned. As another example, based on a pattern and phrase which it learns in store and day of action taken, the system can automatically suggest opening multiple tills or standard preference.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the system can include a neural network with multiple input nodes that receive training datasets. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to assess likelihood that a caller is a scam caller, and so forth. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new call data.

Returning to FIG. 3, after generating the suggested modifications, at act 320, process 300 presents one or more of the suggested modifications to a user. In some implementations, process 200 filters the generated suggested modifications to present a selected set. For example, process 200 can filter the generated suggestions based on user preference information, time of day, store information, and so on. For example, a user may have not noticed that a particular day is a holiday. But based on the behavior learnings, the system can recognize that the particular day is expected to be a busy day at the store. In this example, when a user just issues a command as "open store", the system can suggest to the user that since the particular day is a holiday event, would the user like to open more tills than the usual preferences. At act 325, process 300 receives a final set of instructions and generates, at act 330, a set of operations for the final instructions set (similar to act 220 of FIG. 2). At act 335, process 300 executes the operations in the generated set of operations to alter the current state of the identified store (similar to act 225 of FIG. 2).

Computer System

Figure 6:
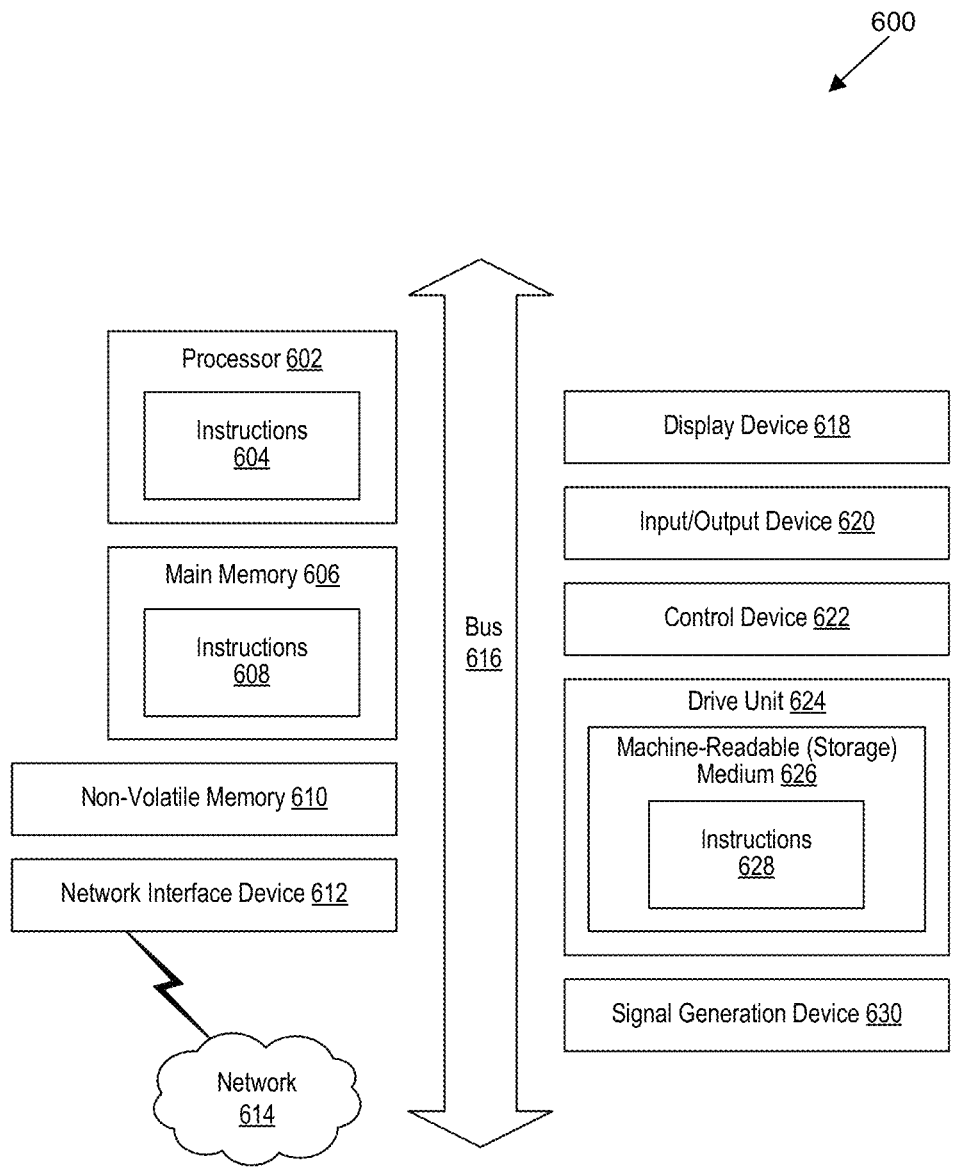
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or acts are presented in a given order, alternative implementations can perform routines having steps, or employ systems having acts, in a different order, and some processes or acts may be deleted, moved, added, subdivided, combined, and/or modified to provide alternative or sub-combinations. Each of these processes or acts can be implemented in a variety of different ways. Also, while processes or acts are at times shown as being performed in series, these processes or acts can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer system comprising:
   at least one hardware processor; and
   at least one non-transitory memory storing instructions, which, when executed by the at least one hardware processor, cause the computer system to:
      receive an instruction for performing one or more operations on a plurality of retail stores;
      apply a trained machine learning model to generate one or more suggested modifications to the received instruction;
      generate one or more application programming interface (API) calls based on the generated one or more suggested modifications,
         wherein the one or more operations comprise opening the plurality of retail stores, closing the plurality of retail stores, opening tills in the plurality of retail stores, closing the tills in the plurality of retail stores, performing an audit of the plurality of retail stores, and/or generating reports for the plurality of retail stores; and
      perform, using the one or more API calls, the one or more operations on the plurality of retail stores.

2. The computer system of claim 1, wherein the machine learning model is trained using customer information, user information, store information, social media information, and/or news information.

3. The computer system of claim 1, wherein the plurality of retail stores are associated with a telecommunications service provider.

4. The computer system of claim 3, wherein a source of the instruction is affiliated with the telecommunications service provider.

5. The computer system of claim 1, wherein the instruction is received via a voice bot.

6. The computer system of claim 1, wherein the one or more operations are performed at an execution time determined based on operating hours of the plurality of retail stores and/or current events information.

7. The computer system of claim 1, wherein the received instruction comprises information identifying the plurality of retail stores.

8. A computer-implemented method comprising:
   receiving an instruction for performing one or more operations on a plurality of retail stores;
   applying a trained machine learning model to generate one or more suggested modifications to the received instruction;
   generate one or more application programming interface (API) calls,
   generating one or more application programming interface (API) calls based on the one or more suggested modifications,
      wherein the one or more operations comprise opening the plurality of retail stores, closing the plurality of retail stores, opening tills in the plurality of retail stores, closing the tills in the plurality of retail stores, performing an audit of the plurality of retail stores, and/or generating reports for the plurality of retail stores; and performing, using the one or more API calls, the one or more operations on the plurality of retail stores.

9. The computer-implemented method of claim 8, wherein the instruction is received via a voice bot.

10. The computer-implemented method of claim 8, wherein the machine learning model is trained using customer information, user information, store information, social media information, and/or news information.

11. The computer-implemented method of claim 8, wherein the one or more operations are performed at an execution time determined based on operating hours of the plurality of retail stores and/or current events information.

12. The computer-implemented method of claim 8, wherein the received instruction comprises information identifying the plurality of retail stores.

13. The computer-implemented method of claim 8, wherein a source of the instruction is affiliated with the telecommunications service provider.

14. At least one non-transitory computer-readable storage medium storing instructions, which, when executed by at least one data processor of a system, cause the system to:
   receive an instruction for performing one or more operations on a plurality of retail stores;
   apply a trained machine learning model to generate one or more suggested modifications to the received instruction;
   generate one or more application programming interface (API) calls based on the generated one or more suggested modifications,
   wherein the one or more operations comprise opening the plurality of retail stores, closing the plurality of retail stores, opening tills in the plurality of retail stores, closing the tills in the plurality of retail stores, performing an audit of the plurality of retail stores, and/or generating reports for the plurality of retail stores; and
   perform, using the one or more API calls, the one or more operations on the plurality of retail stores.

15. The non-transitory computer-readable storage medium of claim 14, wherein the plurality of retail stores are associated with a telecommunications service provider.

16. The non-transitory computer-readable storage medium of claim 14, wherein the instruction is received via a voice bot.

17. The non-transitory computer-readable storage medium of claim 14, wherein the machine learning model is trained using customer information, user information, store information, social media information, and/or news information.

18. The non-transitory computer-readable storage medium of claim 14, wherein the one or more operations are performed at an execution time determined based on operating hours of the plurality of retail stores and/or current events information.

* * * * *